[19] United States Patent
Dussault

[11] Patent Number: 4,569,112
[45] Date of Patent: Feb. 11, 1986

[54] METHOD OF ASSEMBLING A UNIVERSAL EMERGENCY BRAKE SYSTEM ON A VEHICLE

[76] Inventor: Jean-Paul Dussault, 29 Notre-Dame de Fatima St., Loretteville, Quebec, Canada, G2A 2E8

[21] Appl. No.: 611,971

[22] Filed: May 16, 1984

Related U.S. Application Data

[62] Division of Ser. No. 341,527, Jan. 21, 1982.

[51] Int. Cl.⁴ .............................................. B23P 6/00
[52] U.S. Cl. .............................. 29/402.08; 29/402.03; 188/2 D
[58] Field of Search ........... 29/402.01, 402.03, 402.08; 188/2 D, 342; 74/501 R, 501 P, 501.5; 192/111 A, 111 B, 111 T, 111 R

[56] References Cited

U.S. PATENT DOCUMENTS

3,101,205  8/1963  Benham ............... 188/2 D
3,788,438  1/1974  Reno ............... 74/501.5 R X Primary Examiner—Howard N. Goldberg
Assistant Examiner—Joseph M. Gorski
Attorney, Agent, or Firm—Schwartz, Jeffery, Schwaab, Mack, Blumenthal & Evans

[57] ABSTRACT

A method of replacing an emergency cable system comprising a cable, a spring and a protective sleeve. The spring and sleeve are mounted on the cable and a detachable fixation member on the cable permits the spring and sleeve to be removed and cut to length. The sleeve has a connector on each end. One sleeve connector is also removable to allow the sleeve to be cut to length.

2 Claims, 12 Drawing Figures

METHOD OF ASSEMBLING A UNIVERSAL EMERGENCY BRAKE SYSTEM ON A VEHICLE

This is a division, of application Ser. No. 341,527, filed Jan. 21, 1982.

The present invention relates to a replacement emergency cable system for use in vehicles, which cable system is constructed so that it can be easily modified to fit many different installations.

At the present time each different type of vehicle has a specific emergency brake cable system, and the cable system of one type of vehicle will not normally fit any other type of vehicle. The brake cable system used in one type of vehicle usually differs in length from the lengths of the systems used in other types of vehicles. As a result of the many different cable systems employed, it is impossible for a small garage operator to stock all the different cable systems he might need. Instead the garage operator must order the particular cable system needed from a large parts supplier who can afford to carry many more cable systems in stock than the small garage operator. To order and obtain the particular cable system needed takes time however and repairs are thus delayed. In addition, the cost of the replacement cable system is relatively expensive because of the large inventory needed to provide the many different cable systems.

The purpose of the present invention is to provide a replacement cable system which can be easily modified to fit many different installations. By using a few cable systems which can be modified to fit many different installations, a small garage operator can afford to carry a small number of such systems in stock and easily modify each system to fit most installations encountered. Thus, most emergency brake cable system repairs can be made more quickly and inexpensively.

The cable system of the present invention employs a cable, a spring about a portion of the cable, and a protective sleeve about another portion of the cable. Means are provided on the cable so that both the sleeve and the spring can be removed from the cable, and, together with the cable, cut to the required length for the particular installation in which the cable system is to be used.

The sleeve has a first connector at one end which is preferably fixed to the sleeve. This first connector may connect the sleeve to a wheel cover at the point where the cable enters the wheel cover to connect to the brake mechanism within the cover, or to a support wall forming part of the vehicle. A second connector is mounted on the other end of the sleeve. Means are provided for detachably mounting this second connector on the sleeve so it can be removed if the sleeve is to be cut to reduce its length to fit a certain installation. After the sleeve has been cut, the second connector is replaced.

The cable has a main connector fixed at one end. The spring is mounted on the cable between this main connector and the sleeve. A fixation member is detachably mounted on the cable adjacent its other end. The fixation member can be removed to permit removal or installation of the spring and the sleeve on the cable, and its position can be altered on the cable to suit the required installation length of the cable.

More particularly, the present invention proposes an emergency brake replacement cable system comprising:

a cable having a main connector fixed thereto at one end;

a spring adapted to be mounted on the cable adjacent the said one end;

a protective sleeve adapted to be mounted on the cable adjacent the spring, this sleeve comprising a first connector at one end and a second connector at the other end, at least one of the sleeve connectors being detachably connected to the sleeve so it can be temporarily removed to permit the sleeve to be cut, if needed, to a required length; and a fixation member detachably mounted on the cable at the other end thereof so that it can be temporarily removed to permit installation of the spring and the sleeve on the cable after the spring, sleeve and/or cable have been cut, if needed, to their required length.

The invention will be better understood with reference to the following description made in connection with the accompanying drawings in which:

FIG. 9 is a schematic view indentical to the one shown of FIG. 1, including another emergency braking system with primary and secondary cables;

Figure 1:
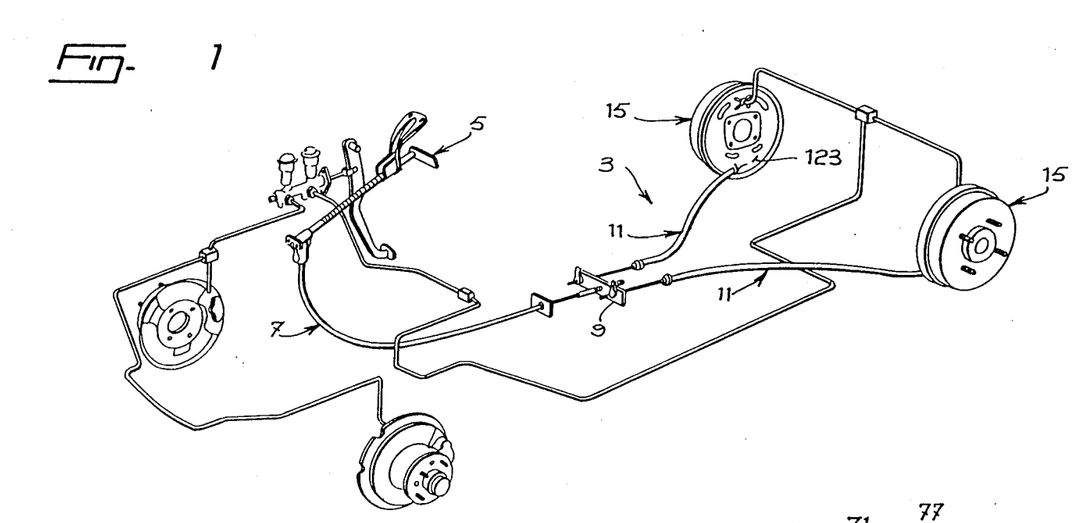
FIG. 1 is a schematic view of a vihicle braking system, including an emergency braking system with primary and secondary cables.

The replacement emergency cable system according to the invention is intended to be used in the emergency braking system 3 of a vehicle as shown in FIGS. 1 or 9. The emergency braking system 3 includes an emergency brake handle or pedal 5, a primary brake cable 7, an actuating plate 9 and two secondary cables 11. The primary cable 7 connects the brake handle 5 to the actuating plate 9. One end of each secondary cable 11 is connected to the actuating plate 9. The other end of each secondary cable 11 is connected to the brake mechanism 13 (see FIG. 2) in a vehicle wheel 15. Operation of brake handle or pedal 5 will move the actuating plate 9 through the primary cable 7. Movement of actuating plate 9 will in turn actuate the brake mechanism 13 in each vehicle wheel 15 through the secondary cables 11.

The replacement emergency cable system 1 of the present invention is used to replace at least one of the primary and secondary cables 7 and 11 if it breaks or is damaged.

Figure 2:
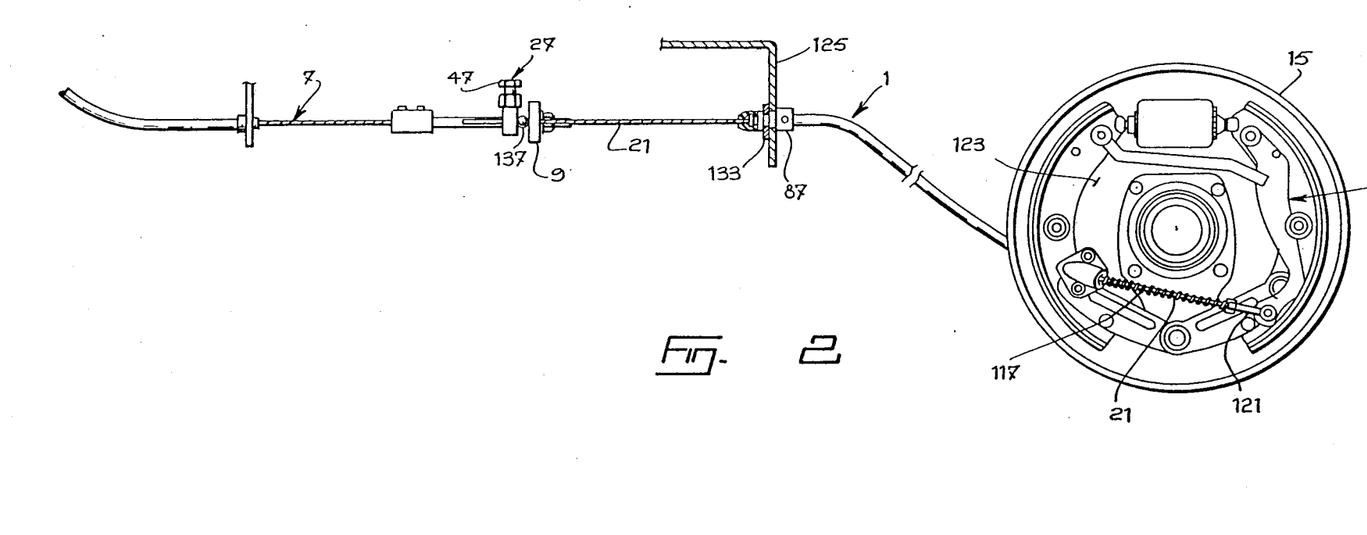
FIG. 2 is a detail side view of a portion of the emergency braking system of FIG. 1 showing a replacement cable system according to the invention in replacement of a secondary cable.
Figure 3:
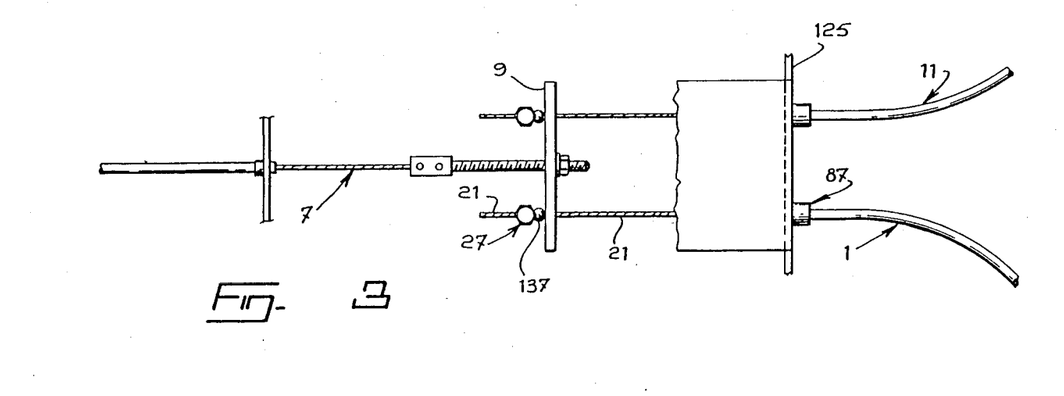
FIG. 3 is a detail top view of a portion of the emergency braking and replacement cable systems of FIG. 2.

In accordance with a first embodiment of the invention shown in FIGS. 2 and 3, the replacement cable system 1 according to the invention is used to replace either one or the other secondary cable 11 of the emergency braking system 3 shown in FIG. 1.

Figure 4:
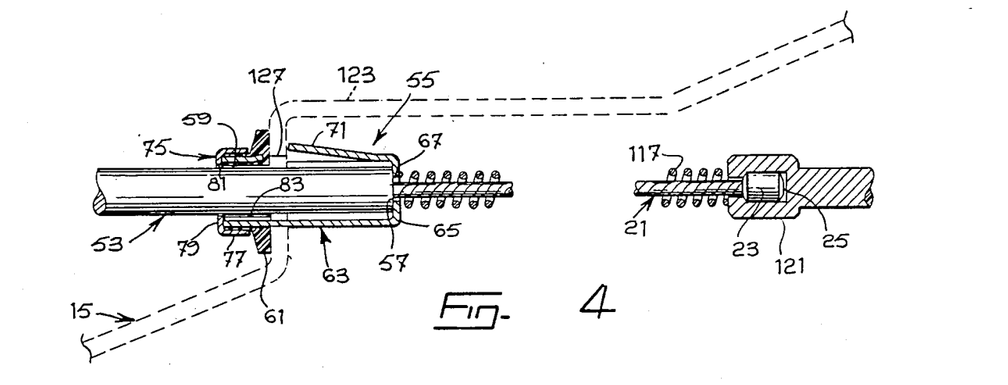
FIG. 4 is a detail cross-section view of one end of the emergency replacement cable system according to the invention.
Figure 5:
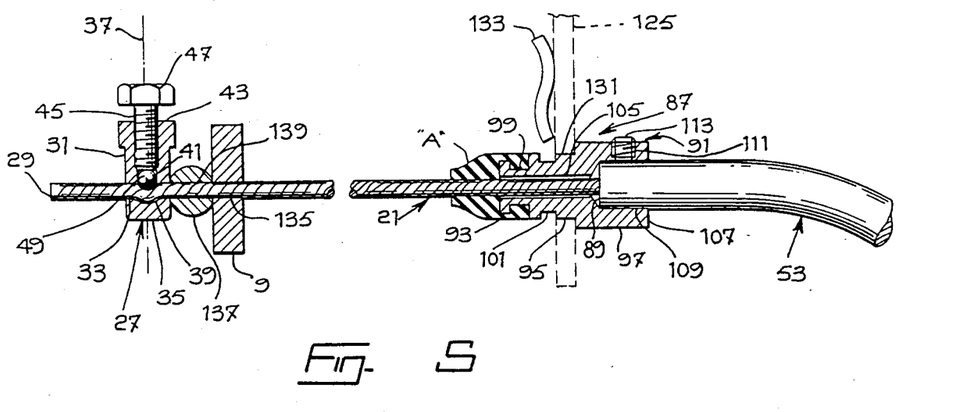
FIG. 5 is a detail cross-section view of the other end of the emergency replacement cable system according to the invention.

The replacement cable system 1 as shown in FIGS. 2 and 3 includes a cable 21 having a length equal to the longest length needed. A small cylindrical connector member 23 is fixed to one end 25 of the cable 21 as shown in FIG. 4. An adjustable stop member 27 is mounted on the cable 21 adjacent its other end 29 as shown in FIG. 5. The adjustable stop member 27 includes a cylindrical body 31 having a through hole 33 adjacent one end 35 extending transverse to the longitudinal axis 37 of the body 31. The through hole 33 is offset at its central portion toward end 35 as shown at 39. An axial hole 41, extending axially inwardly from the other end 43 of body 31, intersects through hole 33. A major portion 45 of hole 41 is counterbored and threaded. A bolt 47 is provided to enter the threaded portion 45 of hole 41 and a ball 49 is mounted in hole 41 beneath bolt 47. With bolt 47 partly withdrawn from body 31, the cable 21 is threaded through hole 33. The cable 21 is passed through the body 31 the desired distance and bolt 47 is then screwed into body 31 to push ball 49 against the cable 21 and crimp it in the offset portion 39 of hole 33 to securely lock stop member 27 on cable 21 in the desired position.

Figure 6:
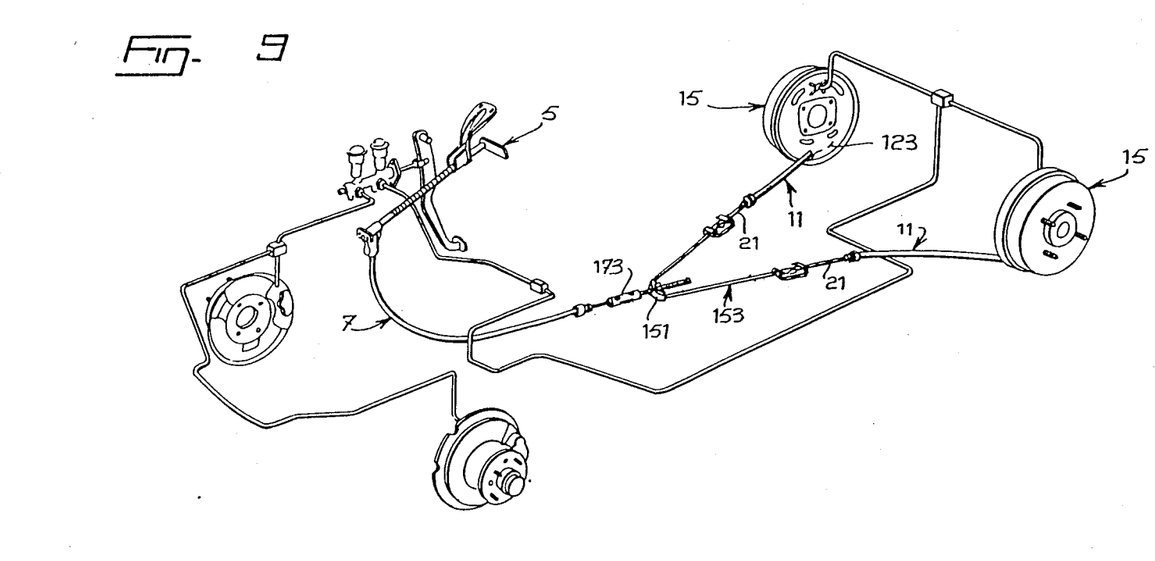
FIG. 6 appearing on the same sheet of drawings as FIG. 1, is a perspective view of one of the sleeve connectors.
Figure 7:
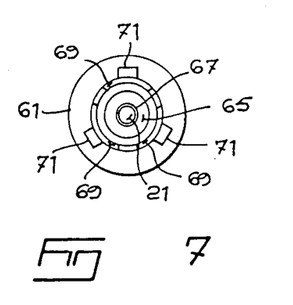
FIG. 7 is an end view of the sleeve connector shown in FIG. 6.
Figure 8:
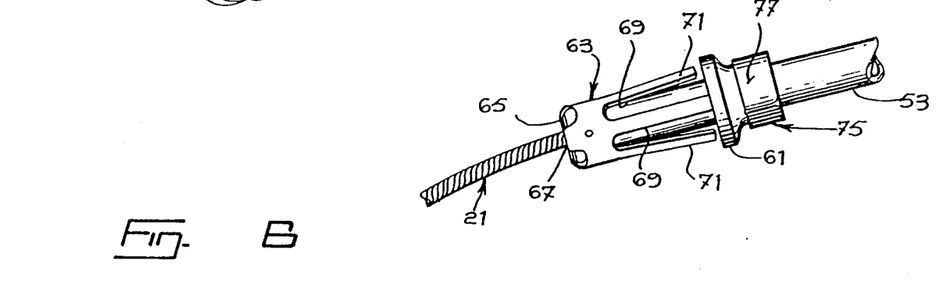
FIG. 8 is a cross-sectional view of the clip used in the system.

A protective sleeve 53 forms part of cable system 1. Sleeve 53 also has a length equal to the longest length of sleeve which might be needed and covers a substantial portion of the cable 21 between connector member 23 and adjustable stop member 27. A first sleeve connector 55 is fixed over one end 57 of sleeve 53. The first connector 55 as shown in FIG. 4 has an tubular main body 59 with an disk-shaped stop 61 on one end of, and integral with, the main body 59. The main body 59 and stop 61 are preferably made from resilient material. The connector 55 includes an elongated, tubular, metallic housing 63 integrally molded within body 59 and stop 61. The housing 63 projects axially from body 59 and stop 61. The housing 63, as shown in FIGS. 6 and 7 has an end wall 65 at its free end with a central aperature 67 therein. The housing 63 has longitudinal slots 69 spaced about its periphery, the slots 69 extending from near the end wall 65 to the stop 61. A lock finger 71 is centrally located in each slot 69, extending from the portion of the housing 63 adjacent the end wall 65 toward, but terminating short of, stop 61. Each finger 71 is bent slightly outwardly away from the longitudinal axis of the main body 59 and housing 63.

The connector 55 is mounted over the end 57 of sleeve 53 with the aid of a cap 75 as shown in FIG. 4. The cap 75 has a skirt 77 and an end wall 79. End wall 79 has a central hole 81 and the cap 75 is first mounted on sleeve 53 by sliding the end 57 of sleeve 53 through the hole 81. The connector 55 is next mounted on sleeve 53 by sliding the end 57 of sleeve 53 through the central hole 83 in body 59 and stop 61, and through tubular housing 63 until end 57 abuts end wall 65 of housing 63. Cap 75 is then moved against connector 55 with the skirt 77 snugly covering body 59. The skirt 77 of cap 75 is then tightly crimped to secure connector 55 to sleeve 53.

A second sleeve connector 87 is detachably connected to the other end 89 of sleeve 53. The second sleeve connector 87 has a body 91 with a first outer cylindrical section 93, a second central cylindrical section 95 slightly larger in diameter than the first section 93, and a third outer cylindrical section 97 slightly larger in diameter than the second central section 95. The first section 93 has an encircling groove 99 therein adjacent the second section 95. The second section 95 also has an encircling groove 101 therein intermediate its ends. A hole 105 extends axially through body 91 slightly larger in size than cable 21. Hole 105 is counterbored for a short distance inwardly from the large end 107 of body 91 as shown at 109. A threaded hole 111 extends transversely into counter-bore 109 in section 97. A set screw 113 is mounted in hole 111. The connector 87 is mounted on the sleeve 53 by inserting end 89 of sleeve 53 into counterbore 109 and tightening set screw 113 against sleeve 53 to securely lock connector 87 to sleeve 53.

The cable system 1 includes a spiral spring 117, as shown in FIG. 4, having a length equal to the maximum length of spring needed. The spring 117 is sized to just fit over the cable 21 and is positioned inside or outside the wheel between the connector member 23 fixed at the one end 25 of the cable, and the first sleeve connector 55 on the end 57 of sleeve 53.

In use, the adjustable stop member 27 is removed from the cable 21 allowing both the sleeve 53 and spring 117 to be removed from cable 21.

The connector member 23 at the one end 25 of the cable 21 is then detachably connected to an actuating member 121 in the brake mechanism 13 in wheel 15, and the cable 21 is run back along the path it will follow to, and just past, the actuating plate 9. Any excess length of cable 21 at end 29 is then cut off. The length of spring 117, needed to extend between the actuating member 121 of brake mechanism 13 and the end 57 of sleeve 53 within the wheel 15, is determined and the spring 117 is accordingly cut to length if needed. The length of protective sleeve 53, needed to extend between the wheel cover 123, where cable 21 enters the wheel 15, and a support wall 125, is determined and if a shorter length is needed, connector 87 is removed, the sleeve 53 is cut to length from end 89 and the connector 87 is then replaced on the cut end of sleeve 53.

With the cable 21, spring 117, and sleeve 53 all now the proper length, the replacement cable system 1 is assembled in place. The spring 117 is mounted on cable 21 within the wheel 15 to abut brake mechanism actuating member 121 while connector 23 of cable 21 is detachably connected to the member 121. The other end 29 of cable 21 is then threaded through a hole 127 in cover 123. The sleeve 53 is mounted on the portion of the cable 21 extending from cover 123, and the tubular housing 63 in the first sleeve connector 55 is forced through hole 127 to connect the sleeve 53 to cover 123 as shown in FIG. 4. The lock fingers 71 on housing 63 move inwardly to allow housing 63 to pass into hole 127. Once the fingers 71 move past cover 123 they spring back outwardly to securely lock the connector 55 to the cover 123. In the locked position, the stop 61 abuts tight against cover 123.

The cable 21 is passed through an opening 131 in wall 125. The second connector 87 on the other end 89 of sleeve 53 is also passed through the opening 131 in the wall 125 as shown in FIG. 5. The opening 131 has a diameter greater than the diameter of the central section 95 of connector 87 and less than the diameter of the large outer section 97. The large section 97 abuts tight against wall 125 and a spring clip 133 is mounted in the groove 101 on the central section 95 of the connector 87 to bear against wall 125 to tightly hold the connector to wall 125. The sleeve 53 which forms an arch, is now tightly held between cover 123 and wall 125 protecting the most exposed portion of the cable 21.

The cable 21 is threaded through a hole 135 in actuating plate 9. A spherical ball 137 as shown in FIG. 5, having a central through hole 139, is mounted on the cable 21 to abut against the plate 9 on the side adjacent the brake handle 5. The stop 27 is then mounted on the cable 21 adjacent the ball 137 and the bolt 47 is tightened to crimp the cable 21 and securely lock the stop 27 on the cable. The spherical ball 137, mounted between plate 9 and stop 27, minimizes wear on the cable 21.

In the above described embodiment, reference has been made only to an emergency braking system 3 including, inter alia, an actuating plate 9 to which are connected the secondary brake cables 11, and therefore the replacement cable systems 1 according to the invention, whenever necessary.

Figure 10:
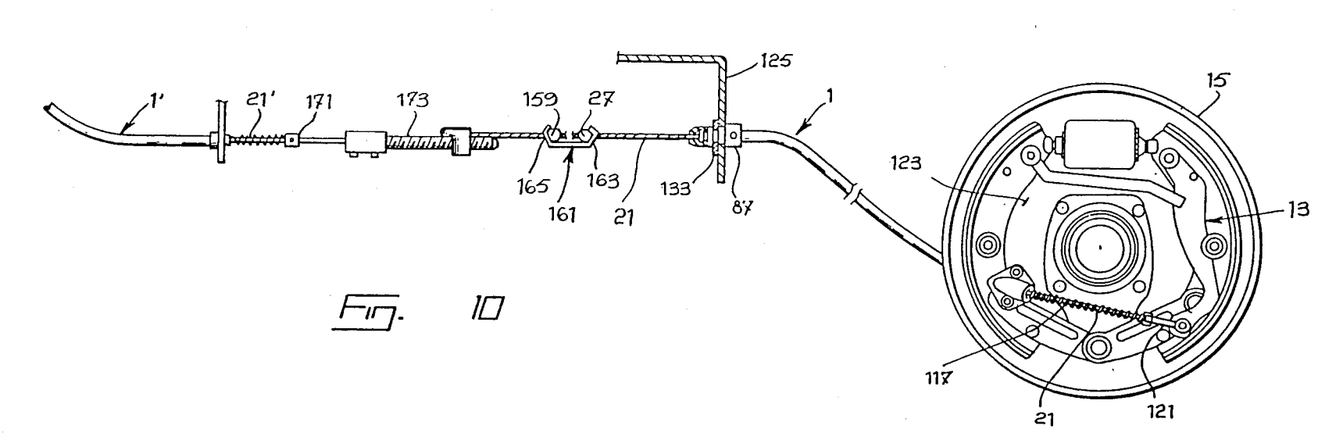
FIG. 10 is a detail side view of a portion of the emerfency braking system of FIG. 9 showing a replacement cable system according to the invention in replacement of a secondary cable.
Figure 11:
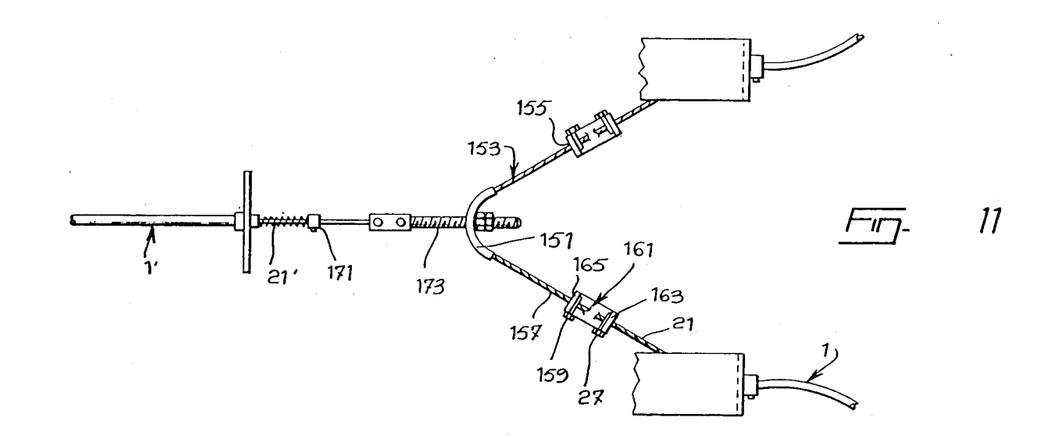
FIG. 11 is a detail top view of a portion of the evemgency braking and replacement cable systems of FIG. 10.

However, there are some vehicles wherein the emergency braking system does not include such an actuating plate 9. In these vehicles whose emergency braking system is shown in FIGS. 9 to 11, the rear end of the primary brake cable 7 is connected to a guide 151 in which a portion of cable 153 is engaged. Both ends 155 and 157 of this cable 153 are connected to the secondary brake cables 11, respectively.

It is obvious that this structural difference in the emergency braking system used in connection with certain types of vehicles, does not affect the structure and installation of the replacement cable system 1 according to the invention, whose structure and installation have been previously described. Indeed, after having cut to length the various structural elements of the replacement cable system 1, the end of the cable 21 can be easily fixed to either end 155 or 157 of the cable 153.

The fixation of the end of cable 21 to an end of cable 153 can be easily carried out by means of a small connecting plate 161 having when seen in side elevation the shape of an large U whose branches 163 and 167 are perforated to let the ends of the cables 121 and 51 pass therethrough respectively. The upper extremities of the branches 163 and 167 of the U-shaped piece 161 are also bent inwardly for retaining the stop members used for fixing the ends of the cables. These stop members can comprise a stop 27 locked on the cable 21 and another stop 159 identical to the stop 27, locked on the cable 151.

In the above disclosure, mention has been made only to the replacement of a secondary brake cable 11 by a replacement cable system 1 according to the invention. It should be noted however that the primary brake cable 7 of an emergency braking system can also be replaced by a replacement cable system according to the invention, as shown on FIG. 12.

The replacement cable system 1' used for replacing the primary cable 7 comprises the same structural elements as the replacement cable system 1 previously described for replacement of a secondary brake cable 11. Accordingly, the same structural elements have been identified by the same numeral references of FIG. 12, with the addition of a prime (').

Figure 12:
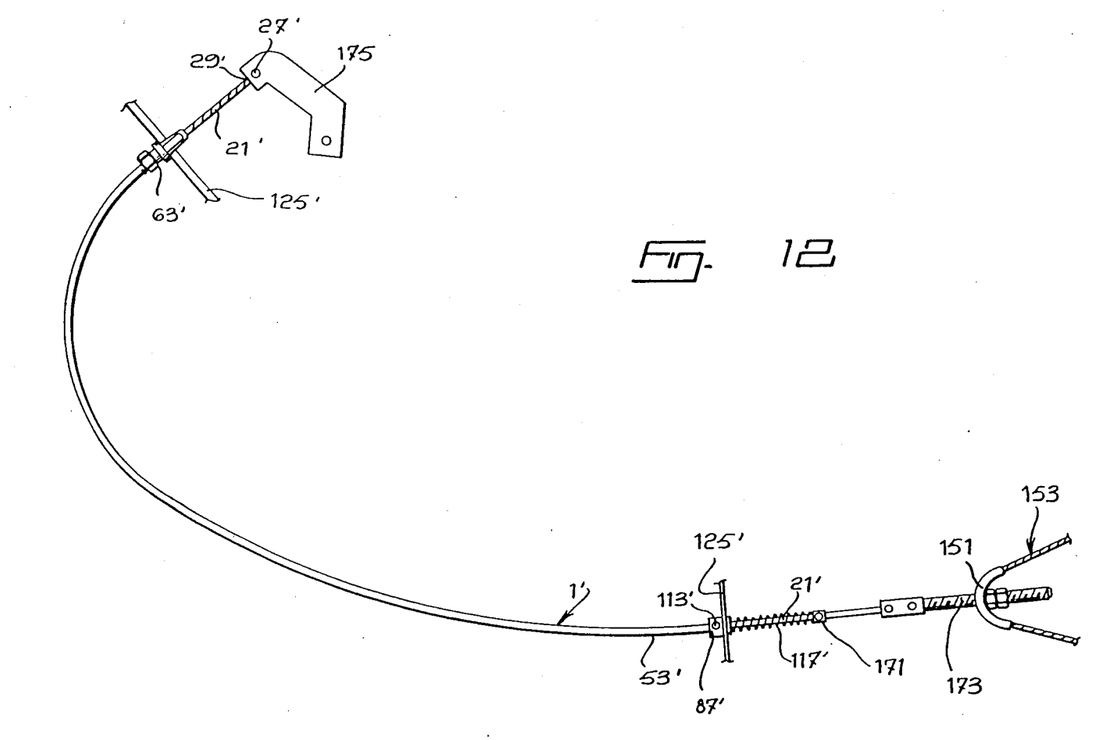
FIG. 12 is a detail side view of a portion of a further emergency braking system showing a replacement cable system according to the invention in replacement of a primary cable.

These structural elements of course comprise a cable 21' having one end connected in a removable manner to the actuating member 173 of the actuating plate 9 or guide 151. The other extremity 29' of the cable 21' is connected by means of a detachable fixation member 27' to the actuating lever 175 of an emergency braking system operated by hand or by foot.

The replacement cable system 1' also comprises a protective sleeve 53', a sping 117' maintained in position by a removable fixation member 171, a tubular housing 63', and a detachable sleeve connector 87'.

All these structural elements can be connected to each other after having cut them to length, and subsequently connected them to a rigid support 125' forming an integral part of vehicle, in the same manner as the structural elements of the replacement cable system 1 previously described in detail are connected and mounted.

It should be noted that these structural elements may be not connected to each other in the same manner as described previously in connection with the replacement cable system 1, as their arrangement and/or the particular need of each emergency brake system. Thus, for example, on FIG. 12, the structural elements 63' and 87' are connected to the sleeve 53' with respect to the spring 117 in a manner different from what has been disclosed previously in connection with the replacement cable system 1.

It will be seen that a simple replacement cable system 1 has been provided, components of which can be easily cut to length to fit the system to different installations. The type and/or of the connectors 55, 87 may vary depending on type of vehicle the system is to be installed on. One of the connectors 55, 87 however is always detachably mounted on sleeve 53 so that sleeve 53 can be cut to length if needed.

I claim:

1. A method of replacing an emergency cable system on a wheeled vehicle comprising the steps of:
  (a) removing a secondary cable and associated parts to be replaced,
  (b) providing a replacement cable system comprising:
    (1) a cable having a predetermined length and having a pair of spaced apart distal end;
    (2) a first connection means being to fixed one distal end of said cable for connection of said cable to a brake actuation member of the vehicle;
    (3) a coil spring having a pair of distal ends and having a predetermined length and being loosely wound over said cable at said one distal end of said cable;
    (4) first and second connectors;
    (5) a protection sleeve having a pair of distal ends and a predetermined length and being loosely mounted over said cable extending from one distal end of said spring away from said first connection means toward said second connector;
    (6) said first connector being connected to one distal end of said sleeve;
    (7) said second connector being located at the other distal end of said sleeve;
    (8) said first connector being formed with means for detachably connecting said first connector to said sleeve;
    (9) second connection means detachably mounted on said cable at the other distal end of said cable;
    wherein said predetermined lengths are at least as great as distances between relevant parts of the vehicle on which the replacement cable system is to be mounted;
(c) performing the following steps prior to using the replacement cable system:
  (1) releasing and removing said second connection means from said cable;
  (2) sliding said sleeve, connectors and spring off said cable;
  (3) removing said first connector from said sleeve;
  (4) cutting said cable, sleeve and spring to lengths conforming to the length of said associated parts being replaced; and
(d) assembling the replacement cable system on the vehicle.

2. A method of replacing an emergency brake cable system with a replacement cable system, said emergency brake cable system being mounted on a support element of a vehicle body, on a cover element of a hub part of a wheel of the vehicle, said hub part containing a braking mechanism including and operable by a linearly displaceable brake actuation member, and a linearly displaceable cable pulling member of the vehicle; wherein said brake actuation member is in an inoperative condition of said braking mechanism, spaced a first predetermined distance from said hub part cover element; wherein said hub part cover element is spaced a second predetermined distance from said support element, and wherein said cable pulling member is, in an inoperative position, spaced a third predetermined distance from said brake actuating member, comprising the steps of:
(a) forming an elongated sleeve having a pair of distal ends and having an operative length at least as great as said second predetermined distance;
(b) passing a cable having a pair of distal ends loosely through said sleeve and extending out of both distal ends of said sleeve, said cable having an operative length at least as great as said third predetermined distance;
(c) removably connecting a first means to one distal end of said cable and to said brake actuating member;
(d) removably mounting a second means to the other distal end of said cable for cooperation with said cable pulling member, so constructed that pulling of said pulling member in a direction away from said hub causes linear displacement of said brake actuating member in a like direction and operates said braking mechanism;
(e) securing one distal end of said sleeve on said hub cover element by use of a first connector;
(f) placing a second connector on the other distal end of said sleeve, and connecting said second connector to said support element by use of a third means;
(g) removably connecting said sleeve to one of said first or second connectors by use of a fourth means;
(h) placing a coil spring freely around said cable between said one distal end of said sleeve and said first means; said spring having an operative length at least as great as said first determined distance;
(i) removing said second means from said cable and withdrawing said sleeve and spring from said cable, removing one of said first or second connectors from said sleeves, and cutting said cable, spring and sleeve to said third, first and second predetermined distances, respectively, as needed; and
(j) assembling the replacement cable system on the support element of the vehicle body.

* * * * *